United States Patent
Kosmehl et al.

(10) Patent No.: US 9,383,021 B2
(45) Date of Patent: Jul. 5, 2016

(54) SWITCHING VALVE

(75) Inventors: Ralf Kosmehl, Lehrte (DE); Uwe Klaue, Braunschweig (DE)

(73) Assignee: Protego (USA), Inc., Charleston, SC (US)

( * ) Notice: Subject to any disclaimer, the term of this patent is extended or adjusted under 35 U.S.C. 154(b) by 18 days.

(21) Appl. No.: 13/812,059

(22) PCT Filed: Aug. 12, 2011

(86) PCT No.: PCT/EP2011/004061
§ 371 (c)(1),
(2), (4) Date: Jan. 24, 2013

(87) PCT Pub. No.: WO2012/022449
PCT Pub. Date: Feb. 23, 2012

(65) Prior Publication Data
US 2013/0119287 A1   May 16, 2013

(30) Foreign Application Priority Data

Aug. 16, 2010   (EP) ..................................... 10008514

(51) Int. Cl.
*F16K 1/32* (2006.01)
*F16K 1/36* (2006.01)
*F16K 15/14* (2006.01)

(52) U.S. Cl.
CPC ... *F16K 1/32* (2013.01); *F16K 1/36* (2013.01); *F16K 15/148* (2013.01); *Y10T 137/789* (2015.04)

(58) Field of Classification Search
CPC ............. F16K 1/36; F16K 25/00; F16K 7/12; F16K 7/14; F16K 3/30; F16K 15/148; F01L 3/02; Y10T 137/7879; Y10T 137/7888; Y10T 137/789; Y10T 137/7809; Y10T 137/7909; Y10T 137/7915; Y10T 137/792; Y10T 137/7921

USPC .......... 251/334, 333, 319; 137/854, 843, 852, 137/532, 533, 533.21, 533.31, 534
See application file for complete search history.

(56) References Cited

U.S. PATENT DOCUMENTS 1,338,759 A     5/1920   Washburne
2,223,699 A  *  12/1940  Norgren .................. F16K 15/06
                                                              251/357

(Continued)

FOREIGN PATENT DOCUMENTS

DE            845133 C      7/1952
DE            40 23 845     4/1992

(Continued)

OTHER PUBLICATIONS

"Tensile Modulus—Modulus of Elasticity or Young's Modulus—for some common Materials"—Retrieved Jul. 16, 2015 http://www.engineeringtoolbox.com/young-modulus-d_417.html.*

*Primary Examiner* — Michael R Reid
(74) *Attorney, Agent, or Firm* — Whitham Curtis Christofferson & Cook, PC

(57) ABSTRACT

A switching valve having a valve seat with a longitudinal axis (L) and having a valve plate with a valve plate surface which can be placed into a pass-through position, in which the switching valve is open, and into a closed position, in which the switching valve is closed and the valve plate bears with the valve plate surface, in a contact region, against the valve seat, wherein the valve plate has a modulus of elasticity of at least 1000 N/mm², which switching valve is characterized in that the valve plate, in the closed position, is deformed by a closing force acting thereon, in such a way that the contact region of the valve plate surface in the closed position forms an angle α, which differs from 0°, with the contact region of the valve plate surface in the pass-through position.

15 Claims, 5 Drawing Sheets

(56) References Cited

U.S. PATENT DOCUMENTS

| | | | |
|---|---|---|---|
| 2,270,469 A * | 1/1942 | Osborn, Jr. | 137/854 |
| 2,893,685 A * | 7/1959 | Van Camp | 251/334 |
| 3,294,360 A | 12/1966 | Lundberg | |
| 3,521,659 A * | 7/1970 | Seger | 137/112 |
| 3,540,636 A * | 11/1970 | Dvoracek | 222/501 |
| 3,911,949 A * | 10/1975 | Hilden et al. | 137/854 |
| 4,484,562 A * | 11/1984 | Burt | F23L 13/00 110/147 |
| 4,785,844 A * | 11/1988 | Pankov | 137/242 |
| 5,379,985 A | 1/1995 | Waij et al. | |
| 5,601,112 A * | 2/1997 | Sekiya et al. | 137/512.15 |
| 6,722,629 B1 * | 4/2004 | Nakazawa | 251/129.17 |

FOREIGN PATENT DOCUMENTS

| | | |
|---|---|---|
| FR | 587897 | 4/1925 |
| GB | 1 238 266 | 7/1971 |
| JP | 311861 Y2 | 2/1956 |
| JP | H06505786 A | 6/1994 |
| JP | H09119537 A | 5/1997 |
| JP | 2008068812 A | 3/2008 |
| JP | 2008069873 A | 3/2008 |
| RU | 2073808 C1 | 2/1997 |
| WO | 9215811 | 9/1992 |
| WO | WO92/15811 | 9/1992 |

* cited by examiner

SWITCHING VALVE

FIELD OF INVENTION

The invention relates to a switching valve comprising a valve seat with a longitudinal axis and a valve plate with a valve plate face, which can be brought into a pass-through position, in which the switching valve is open, and into a closed position, in which the switching valve is closed and the valve plate bears against the valve seat in a contact region by means of the valve plate face, wherein the valve plate has a modulus of elasticity of at least 1000 N/mm$^2$.

BACKGROUND

Valves of this type can be used as pressure relief valves or as suction relief valves. A pressure relief valve is always described hereinafter by way of example. The same also applies analogously however for suction relief valves.

With a generic pressure relief valve, the pressure in a container is prevented from rising above a predetermined response pressure. In the closed position, the valve plate bears against the valve seat via the valve plate face and thus seals the valve. If the pressure in the container, which is located beneath the valve seat, then rises above the response pressure, the force acting on the valve plate as a result of the pressure is large enough to bring the valve plate from the closed position into the pass-through position. The valve is thus opened and a pressure compensation can take place. Once sufficient medium has escaped from the container through the valve seat and the pressure in the container beneath the valve seat has again fallen, the valve closes as a result of the valve plate moving from the pass-through position into the closed position. For example, this occurs as a result of the gravitational force acting on said valve plate. The valve plate may additionally be spring-loaded, so that the closing force can be set freely, that is to say the force that must be overcome by the pressure prevailing in the container beneath the valve seat so as to bring the valve plate into the pass-through position.

If a suction relief valve is to be produced by means of the switching valve, the container in which the pressure may not fall below a predetermined response pressure is connected in the described arrangement to the region above the valve plate. If the pressure in the container falls below the predetermined response pressure, a force is thus also applied to the valve plate and moves the valve plate from the closed position into the pass-through position. The switching valve is thus opened and a pressure compensation is enabled between the container and the surrounding environment. Once the pressure in the container has risen above the predetermined response pressure, the force applied to the valve plate by means of the negative pressure in the container is no longer sufficient to hold the valve plate in the pass-through position, and the valve plate is thus brought into the closed position as a result of the closing force acting thereon.

So as to minimize material losses and therefore financial losses as well as environmental impact, it is important that the valve plate bears as tightly as possible against the valve seat via the valve plate face. In order to achieve this, different solution approaches are known in the prior art. For example, it is known to provide a resilient element, with which the tightness between the valve plate face and the valve seat is to be ensured. This resilient sealing element may be attached for example to the upper edge of the valve seat, that is to say the actual area contacting the valve plate face. Due to the closing force acting on this element when the valve is closed, the resilient sealing element deforms and thus ensures that the connection between the valve plate face and the valve seat is sealed.

Alternatively, a resilient element may also be provided in the edge region of the valve plate, where it has the same effect.

A valve plate is known from U.S. Pat. No. 3,394,732, with which an annular groove is provided in the edge region of the valve plate face and is spanned by a resilient sealing element. If a valve of this type is closed, the valve seat deforms the resilient element and presses it into the groove provided therefor. The connection between the valve plate face and the valve seat is sealed in this manner.

It is disadvantageous that the design of a valve plate of this type is relatively complex and therefore cost-intensive. In addition, the plastic layers proposed as the resilient sealing element, for example FEP films, can only be used to a limited extent within a temperature range between 60° and 150°, and are no longer usable thereabove since they leak and crease.

It is also known from the prior art to form a valve plate from a metal and to apply the valve plate directly via its valve plate face to the valve plate likewise consisting of metal. So as to sufficiently seal a connection of this type, both the valve plate and the valve seat have to be produced so as to be very flat. This makes the production method complex and therefore time-intensive and cost-intensive. The valve seat must therefore be ground and lapped so as to produce sufficient flatness. Valve seats or valve plates of this type normally have an unevenness of less than 10 µm.

SUMMARY

The object of the invention is therefore to propose a switching valve that provides sufficient tightness in the closed position of the valve plate and can be produced in a simple and cost-effective manner.

The invention solves the stated object by a generic switching valve, in which the valve plate deforms in the closed position as a result of a closing force acting thereon, in such a way that the contact region of the valve plate face in the closed position forms an angle α, which is different from 0°, together with the contact region of the valve plate face in the pass-through position.

The valve plate is resilient in the contact region in which the valve plate bears against the valve seat in the closed position, such that it can adapt to any unevennesses in the valve seat and thus ensure the tightness of the valve in the closed position. In this case, the valve plate is cut from a sheet metal having a relatively flat surface, as is nowadays obtainable on the market in the form of a bulk commodity and is produced for example by rolling. A complex cost-intensive machining process, for example grinding of the valve plate, which may last up to two hours for example, so as to produce the desired flatness of the valve plate can thus be omitted. The valve seat also has to be machined and must achieve a good starting flatness. Since the valve plate according to the invention can compensate for unevennesses, both the valve seat and a valve housing can be formed in a considerably material-reduced manner however.

The angle α is between 0.05° and 10°, preferably between 0.1° and 5°. It is thus ensured that the valve plate deforms sufficiently in the contact region so as to follow the unevennesses of the valve seat and thus ensure the tightness of the system, and also that an excessive mechanical stressing of the valve plate is avoided so that a long service life of the switching valve is achieved. Tests have shown that, with a diameter of the valve seat of 500 mm, unevennesses of one millimeter can be balanced out without difficulty by tensioning the valve seat. Unevennesses of this type in the valve seat may also be caused by an inaccurate installation of the valve, for example in a tank, for example if screws of a flange fastened to the valve seat are tightened asymmetrically or in a non-uniform manner. A valve of this type can thus also be installed in an existing facility in a simple and rapid manner.

As a result of the closing force, the valve plate deforms in a central region in the closed position by up to 2% of the diameter of the valve seat in the axial direction with respect to the longitudinal axis. Due to this large deformation of the central region of the valve plate, the required angle is achieved in the edge region or in the contact region of the valve plate face, so that the valve plate face can adapt to and can follow unevennesses in the valve seat.

In one exemplary embodiment of the invention, the thickness of the valve plate increases toward its center. It is thus ensured that a sufficient resilience is present in the edge regions of the valve plate and in particular in the contact region of the valve plate face so as to deform under the effect of the closing force in accordance with the unevennesses in the valve seat. At the same time, the central region of the valve plate has a sufficient stability, for example so as to fasten a guiding device so as to guide a movement of the valve plate from the closed position into the pass-through position. This embodiment is achieved in a particularly simple manner if the valve plate comprises a plurality of disks arranged concentrically with one another, of which the diameter increases toward the valve seat. In this case, in order to achieve the above-mentioned stability, the last disk facing the valve seat may in turn be a disk of smaller diameter, which protrudes into the valve seat in the closed position of the valve plate.

The valve plate preferably comprises at least one disk having a thickness of 0.5 mm.

The valve plate is fabricated from a steel in particular. However, valve plates made of other metals, for example aluminum, or made of a plastic are also conceivable.

If the valve plate is fabricated from a plastic, its modulus of elasticity is at least 1000 N/mm$^2$. However, a modulus of elasticity of at least 1600 N/mm$^2$ has also proven to be advantageous. The modulus of elasticity of a valve plate made of a plastic may also be 25000 N/mm$^2$ however. If the valve plate is produced from a metal material, its modulus of elasticity lies for example in the range from 40000 N/mm$^2$ to 250000 N/mm$^2$. Valve plates made of aluminum with a modulus of elasticity of 70000 N/mm$^2$, made of titanium with a modulus of elasticity of 105000 N/mm$^2$ and made of a high-grade steel with a modulus of elasticity of 200000 N/mm$^2$ are also possible examples.

Irrespective of the material from which a valve plate is fabricated, the valve plate can be equipped with a raised edge to additionally improve an opening behavior of the valve when the response pressure is reached. Various embodiments of raised edges on valve plates for the purpose of increasing the opening force are known and can also be used with a valve plate according to an exemplary embodiment of the present invention.

The response pressure at which the valve plate is brought from the closed position into the pass-through position is in this case at least 1.5 mbar, preferably at least 2.5 mbar, more preferably at least 5 mbar and at most 1000 mbar, preferably at most 500 mbar, and more preferably at most 15 mbar.

In a first specific exemplary embodiment of the invention, the valve plate comprises a first steel disk having a diameter of 675 mm and a thickness of 0.5 mm. In this case, the valve seat has a diameter of 500 mm. The fact that this first steel disk is much larger than the diameter of the valve plate is due to the desired opening speed of the valve. Of course, it would be sufficient for the first disk to be of such a size that it bears against the valve seat in the closed position of the valve plate. A second disk having a diameter of 450 mm as well as a third disk having a diameter of 400 mm and a fourth disk having a diameter of 350 mm are arranged on this first steel disk. All of these further disks are 0.5 mm thick. Due to the use of steel disks, with which the valve plate bears against the valve seat, likewise consisting of metal, there is no longer any need for resilient sealing elements, in particular consisting of a plastic. Valves of this type can therefore be used in a very wide temperature range. Use is enabled without difficulty in a temperature range from 0° C. to 400° C., although special materials may possibly have to be used above and below this range.

For reasons of stability, a further disk is arranged beneath the first steel disk and has a diameter of 350 mm and a thickness of 2 mm. All of these five aforementioned layers are arranged concentrically with one another and together form the valve plate.

Since the thickness of the valve plate is at its lowest at the edge of the valve plate, in particular in the contact region of the valve plate face, the resilience is greatest at this point. The required resilient deformability is thus achieved and the adaptation of the valve plate to unevennesses in the valve seat is thus ensured.

The valve plate described as an exemplary embodiment has a natural weight of slightly more than 5 kg. Tests have revealed that this valve plate can compensate for unevennesses in the valve seat of approximately one millimeter without difficulty. Here, the valve plate deforms by 3.5 mm downwardly in the central region in the closed position as a result of its natural weight. Since the central region of the valve plate is depressed downwardly, the region of the valve plate face located radially outside the valve seat with respect to the longitudinal axis is raised outwardly. The contact region of the valve plate face in the closed position thus also forms an angle with the same region of the valve plate face in the pass-through position.

A response pressure of 2.5 mbar is given from the natural weight and the resultant gravitational force as well as the nominal width of the valve seat of 500 mm.

In a second specific exemplary embodiment, a valve plate initially comprises two steel disks each having a diameter of 675 mm and a thickness of 0.5 mm. In this case too, the valve seat nominal width is again 500 mm. Two steel disks of identical size each having a thickness of 0.5 mm have a greater resilience than a steel disk having the aforementioned diameter and a thickness of 1 mm. A greater resilience of the valve plate at the edge, in particular in the contact region between the valve plate face and the valve seat, is therefore achieved as a result of this embodiment. Disks having a diameter of 450 mm, 400 mm and 350 mm, each with a thickness of 0.5 mm, are in turn placed on these two steel disks. For stability purposes, a steel disk 350 mm wide having a thickness of 2 mm is in turn attached to the underside of the two large steel disks. All of these disks are again aligned concentrically with one another. So as to achieve a higher response pressure with this valve plate, the valve plate is additionally provided with a further disk arranged thereon, said further disk measuring 350 mm in diameter and 2 mm thick in the described example. The natural weight of the valve plate thus increases to 7.8 kg and the resultant response pressure thus increases to 3.9 mbar.

Response pressures up to 25 mbar are generally set by increasing the natural weight of the valve plate, whereas greater desired response pressures are caused by additional forces, for example via spring-loaded valve plates.

Leakage rates of a few cm³ per minute can be achieved with the described valve plate. A leakage rate of 2.9 cm³/min was thus achieved with a test valve having a valve seat nominal width of 500 mm and a response pressure of 2 mbar.

DETAILED DESCRIPTION

Figure 1A:
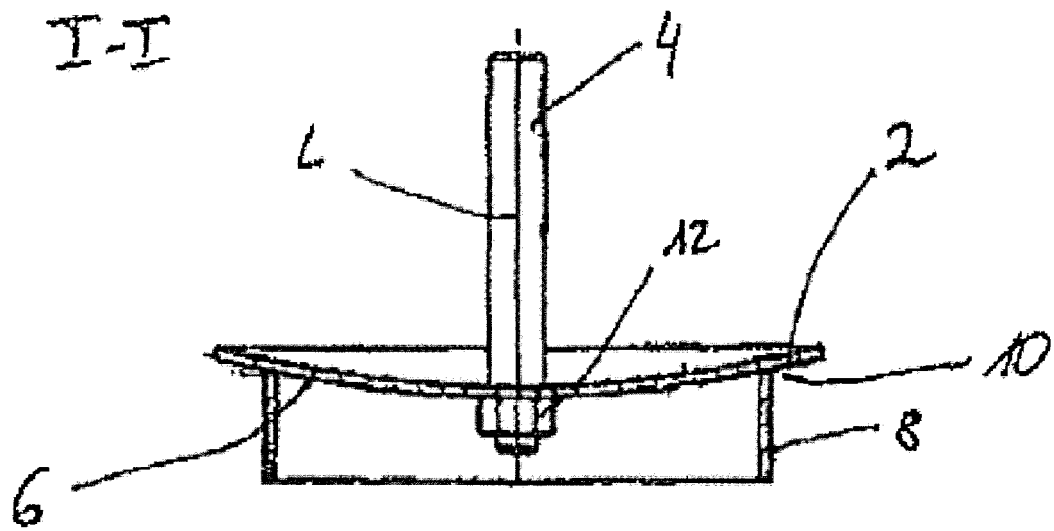
FIGS. 1(*a*)-(*b*) show a schematic plan view of a valve according to a first exemplary embodiment of the present invention.
Figure 1B:
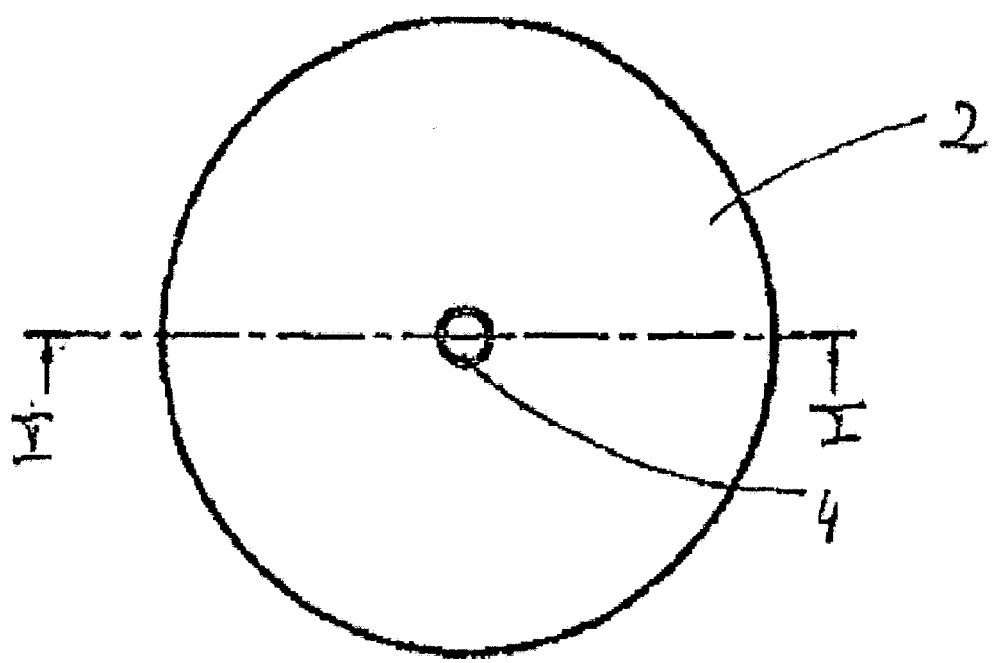

An exemplary embodiment of the present invention will be explained hereinafter in greater detail with the aid of a drawing. FIGS. 1(*b*), 2(*b*), 3(*b*), 4(*b*) and 5(*b*) show a schematic plan view of a valve according to an exemplary embodiment of the present invention, and FIGS. 1(*a*), 2(*a*), 3(*a*), 4(*a*) and 5(*a*) show a section along the horizontal line indicated in the respective corresponding figures.

FIG. 1(*b*) shows a schematic plan view of a switching valve according to a first exemplary embodiment of the present invention. A valve plate 2, which is circular in FIG. 1(*b*), can be seen. A guide 4, along which a movement of the valve plate 2 from a closed position into a pass-through position is guided, is located in the center. A longitudinal axis L, which is the axis of symmetry of the switching valve in the shown exemplary embodiments and along which the valve plate 2 can be moved, runs centrally in the guide 4. FIG. 1(*a*) shows a section through the switching valve along the line I-I.

It can be seen that the valve plate 2 is situated in the closed position. The valve plate 2 bears against a valve seat 8 via its underside, which forms a valve plate face 6. The region of the valve plate face 6 in which the valve plate 2 bears against the valve seat 8 is a contact region 10.

The valve plate 2 shown in FIGS. 1(*a*)-(*b*) consists of two steel plates, which for example each have a thickness of 0.5 mm. The guide 4 is arranged in the center of the valve plate and is connected to the valve plate 2 via a screw connection. A nut 12 is therefore illustrated schematically in FIG. 1(*a*).

If the valve plate shown in FIGS. 1(*a*)-(*b*) is situated in a pass-through position, the valve plate face 6 does not bear against the valve seat 8 in the contact region 10. In this case, the edge region of the valve plate 2 hangs downwardly as a result of the natural weight of the valve plate, and therefore in particular the contact region 10 of the valve plate face 6 hangs downwardly under the influence of the gravitational force. Depending on the level of resilience of the valve plate 2, the contact region 10 may in this case be located 3.5 mm beneath the central region of the valve plate face 6 for example.

In FIGS. 1(*a*)-(*b*), the valve plate 2 is situated in the closed position however, and therefore the valve plate 2 deflects downwardly in the center under its natural weight and the weight of the guide 4. The valve plate 2 is therefore bent upwardly in its edge region. The valve plate face 6 therefore forms an angle α in the contact region 10 together with the valve plate face 6 in the pass-through position. The valve plate 2 with the valve plate face 6 adapts to unevennesses in the valve seat 8 in the event of this deformation, so that the switching valve is sufficiently tight. Leakage rates of less than 94.2 cm.sup.3/min, in particular less than 27 cm.sup.3/min with a nominal width of the valve seat 8 of 500 mm can therefore be achieved with a valve of this type. The response pressure at which the switching valve is opened is in this case between 1.5 mbar and 5 mbar for example. Higher response pressures, for example 15 mbar or 25 mbar, can also be set however.

If the pressure beneath the valve plate 2 in the valve seat 8 exceeds the predetermined response pressure, the valve plate 2 is pressed upwardly with the guide 4, and the switching valve opens. The response pressure may be set in this case via the natural weight of the valve plate 2 with the guide 4. So as to shift the response pressure toward higher pressures, weights can easily be attached to the valve plate 2 or the guide 4.

Figure 2A:
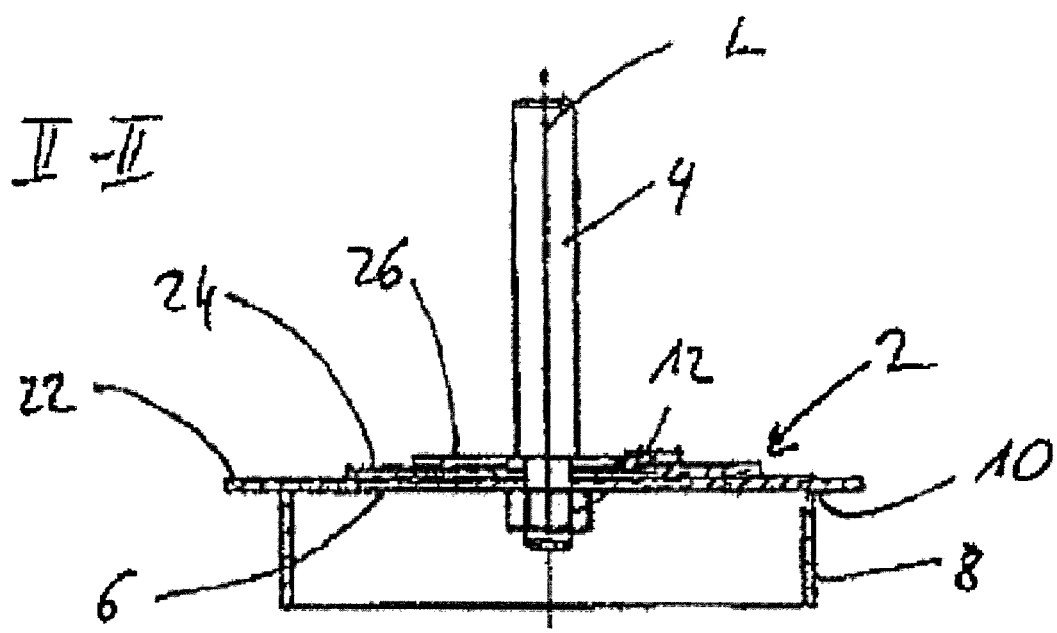
FIGS. 2(*a*)-(*b*) show a schematic plan view of a valve according to a second exemplary embodiment of the present invention.
Figure 2B:
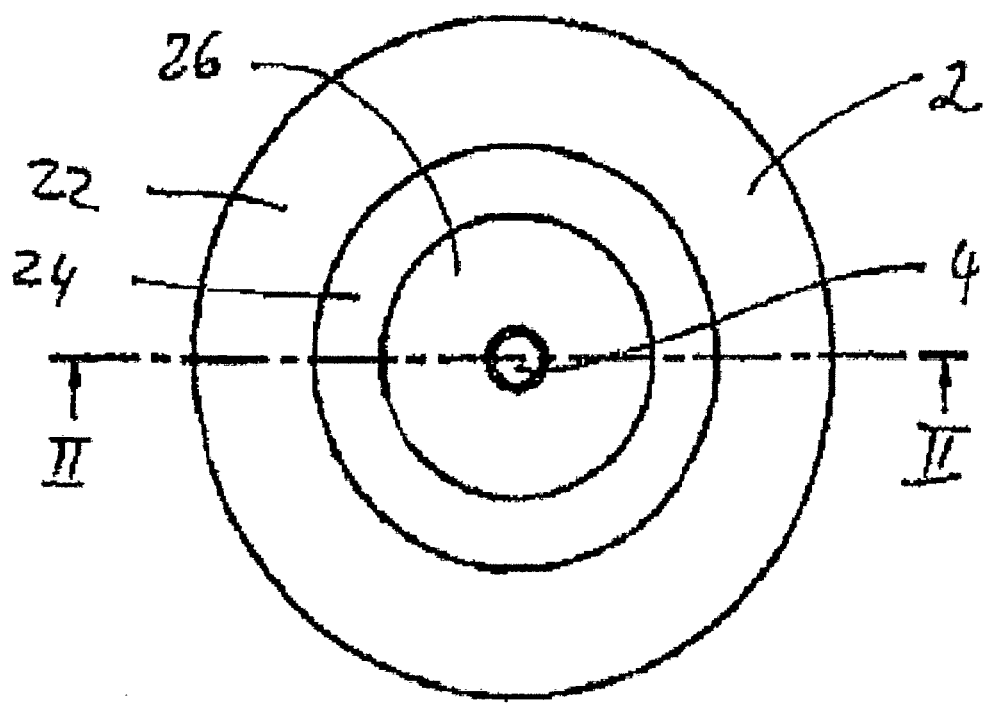

FIG. 2(*b*) again shows a schematic plan view of a switching valve according to a further exemplary embodiment of the present invention. The valve plate 2 shown in this instance and in the center of which a guide 4 is again arranged, consists in this case of a plurality of disks 22, 24, 26 arranged concentrically with one another. A section along the line II-II is shown in FIG. 2(*a*).

It can be seen that the valve plate 2 illustrated in FIGS. 2(*a*)-(*b*) consists of three disks 22, 24, 26 arranged concentrically with one another. The diameter of these disks decreases upwardly in FIGS. 2(*a*)-(*b*). Their thickness is constant and identical for all disks 22, 24, 26, for example 0.5 mm. Of course, the thickness of the disks 22, 24, 26 may also vary and does not have to be constant and identical for all disks.

On the one hand, the natural weight of the valve plate 2 is thus increased compared to the embodiment shown in FIGS. 1(*a*)-(*b*). A switching valve of this type consequently has a higher response pressure than the exemplary embodiment shown in FIGS. 1(*a*)-(*b*).

The valve plate 2 shown in FIGS. 2(*a*)-(*b*) is situated in a position in which the force applied to the valve plate as a result of the pressure in the container, which is located beneath the valve seat 8, is of exactly the same magnitude as the closing force acting on the valve plate 2, this force possibly being the gravitational force acting on the valve plate 2 for example. If response pressures greater than the pressures that can be produced by the natural weight of the valve plate are desired, the valve plate may also be spring-loaded for example.

It can be seen that the valve plate 2 illustrated in FIGS. 2(*a*)-(*b*) indeed bears against the valve seat 8, but is not deflected downwardly in the center. If the valve plate 2 were situated in the closed position, it would deflect downwardly, as in the exemplary embodiment illustrated in FIGS. 1(*a*)-(*b*), and the valve plate face 6, in the contact region 10, would form an angle α with the same region of the valve plate face 6 in the pass-through position. Since, however, the closing force acting on the valve plate 2 is balanced out by the pressure prevailing in the container beneath the valve seat 8, the valve plate face 6 is not bent.

Due to the specific arrangement of a plurality of disks 22, 24, 26, an increased stability is also achieved in the central region of the valve plate 2, in addition to an increase in the natural weight of the valve plate 2, and therefore the guide 4 can be arranged securely.

Since the valve plate 2 is also very thin in the contact region 10, an increased resilience compared to the center is ensured at this point, and therefore the desired deformability is also provided. The valve plate illustrated in FIGS. 2(a)-(b) also deforms in its closed position under the closing force acting thereon, in such a way that the valve plate face 6, in the contact region 10, forms an angle α relative to the contact region 10 of the valve plate face in the pass-through position.

Of course, other structures of a valve plate 2 formed from more or fewer disks 22, 24, 26 are also conceivable. For example, four, five or six disks may also be used, whereby in particular the natural weight and therefore the response pressure of the switching valve can be increased. It has also proven to be advantageous if a further disk, which is smaller but thicker for example, is arranged beneath the largest disk 22 so as to further increase the stability of the arrangement of the guide 4 on the valve plate 2. This smaller disk arranged beneath the largest disk 22 protrudes into the valve seat 8 in the closed position of the valve plate 2.

Figure 3A:
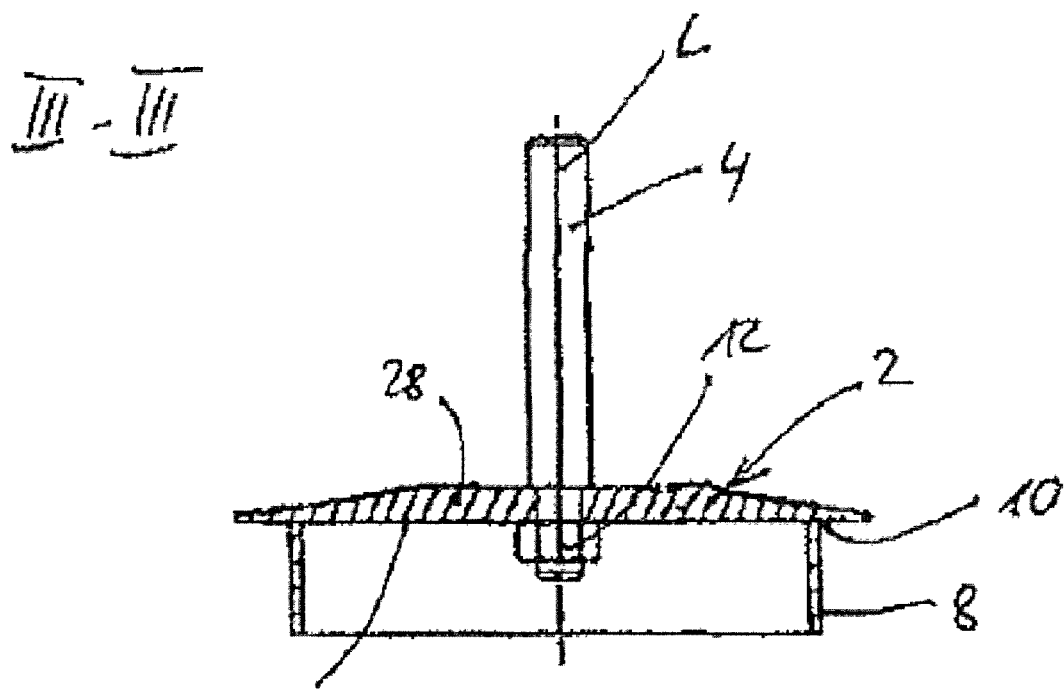
FIGS. 3(*a*)-(*b*) show a schematic plan view of a valve according to a third exemplary embodiment of the present invention.
Figure 3B:
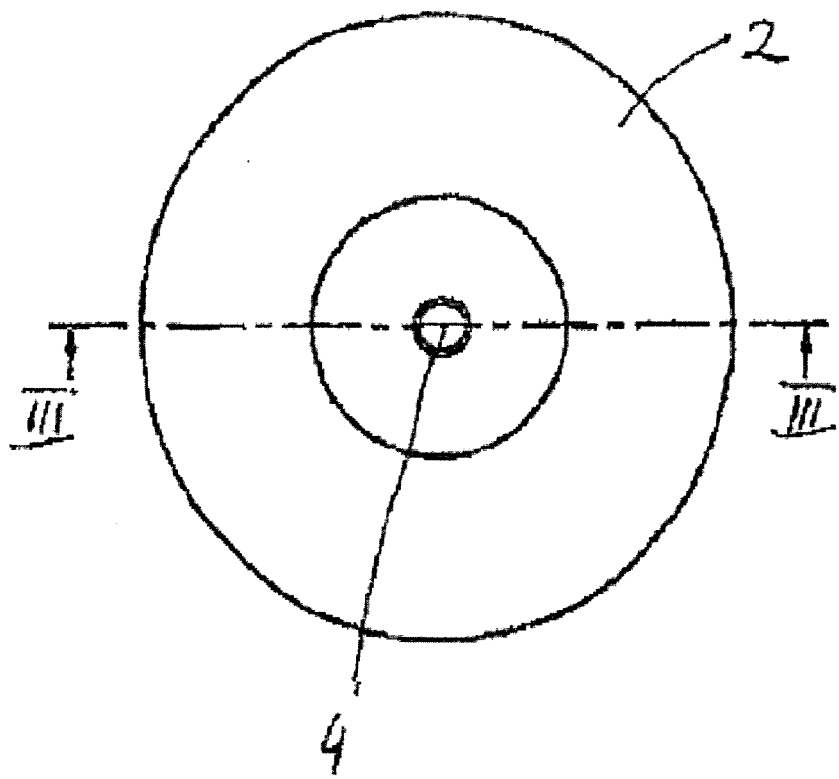

A schematic plan view of a switching valve according to a further exemplary embodiment of the present invention is again shown in FIG. 3(b). A section along the line is illustrated in FIG. 3(a). The valve plate 2 shown in FIGS. 3(a)-(b) consists of a single disk 28, which has a changing thickness, contrary to the exemplary embodiments shown in FIGS. 1(a)-(b) and 2(a)-(b). The thickness of the disk 28 is greatest in the central region, that is to say in the region in which the guide 4 is arranged on the valve plate 2. A sufficient stability of the valve plate 2 in this region is thus also ensured, whilst the resilience necessary for deformation of the valve plate 2 is achieved by the thickness decreasing toward the edge.

The valve plate shown in FIGS. 3(a)-(b) is also situated in the position in which the force acting on the valve plate as a result of the pressure in the container beneath the valve seat 8 is of exactly the same magnitude as the closing force acting on the valve plate, and therefore the valve plate face 6 does not bend, in particular in the contact region 10. If the valve plate 2 is situated in its closed position, it will also deflect downwardly so that the valve plate face 6, in the contact region 10, forms an angle with the contact region 10 of the valve plate face 6 in the pass-through position.

Figure 4A:
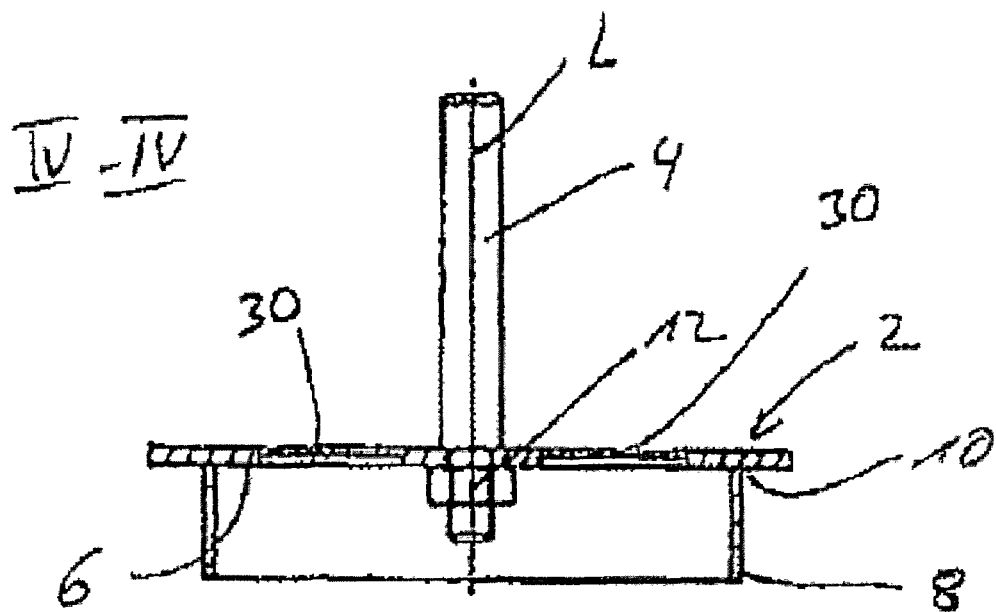
FIGS. 4(*a*)-(*b*) show a schematic plan view of a valve according to a fourth exemplary embodiment of the present invention.
Figure 4B:
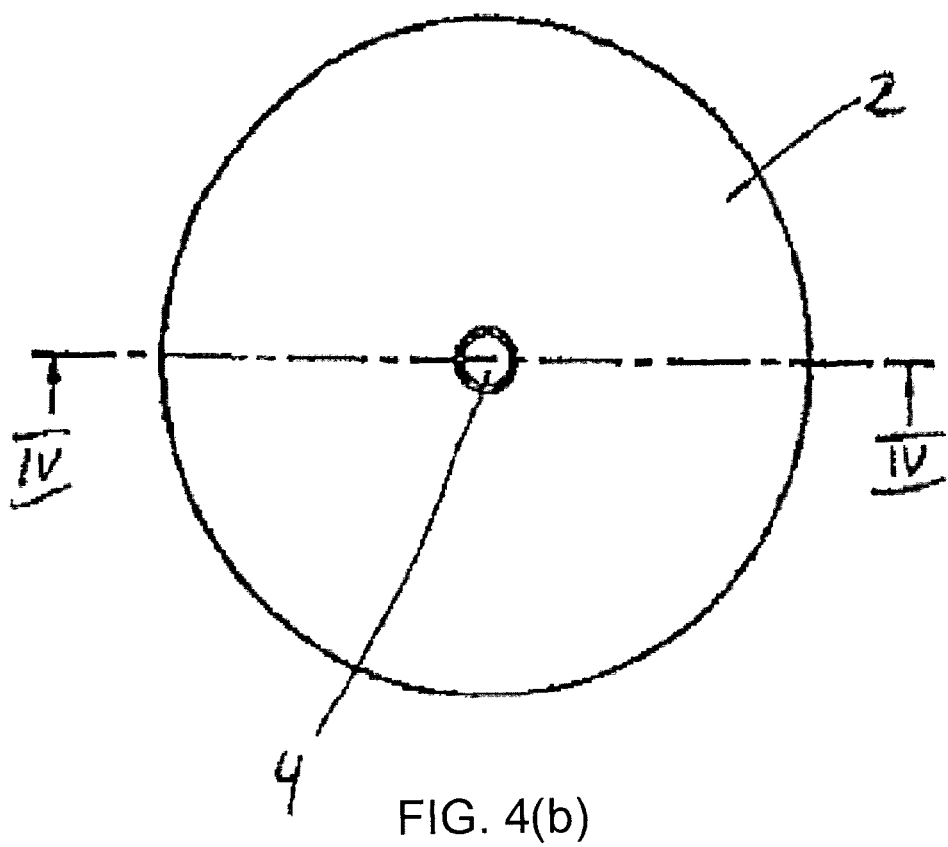

A plan view of a switching valve according to a further exemplary embodiment of the present invention is again shown in FIG. 4(b). A section along the line IV-IV is shown in FIG. 4(a). The valve plate 2 shown in this instance has an annular region, in which a resilient element 30 is located. The resilience necessary for the deformation of the valve plate 2 is therefore provided in this region, whilst the valve plate may be formed in a relatively unresilient and stable manner, in particular in the contact region 10 and in the region in which the guide 4 is arranged on the valve plate 2.

The valve plate illustrated in FIGS. 4(a)-(b) is also situated in the position in which the pressure acting thereon from beneath compensates for the closing force, such that the valve plate face 6 does not bend.

Figure 5A:
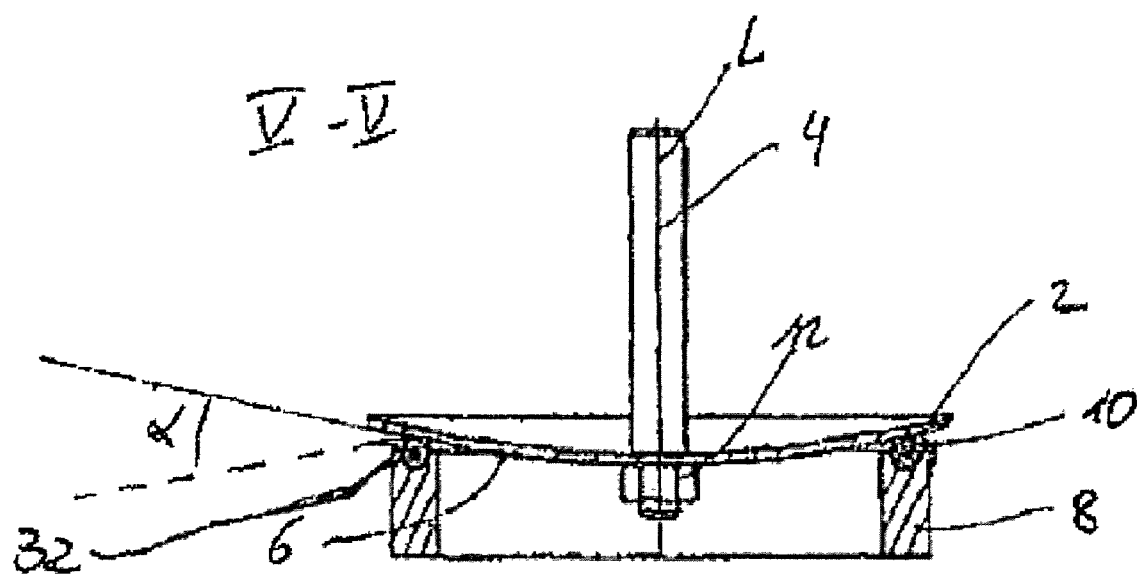
FIGS. 5(*a*)-(*b*) show a schematic plan view of a valve according to a fifth exemplary embodiment of the present invention.
Figure 5B:
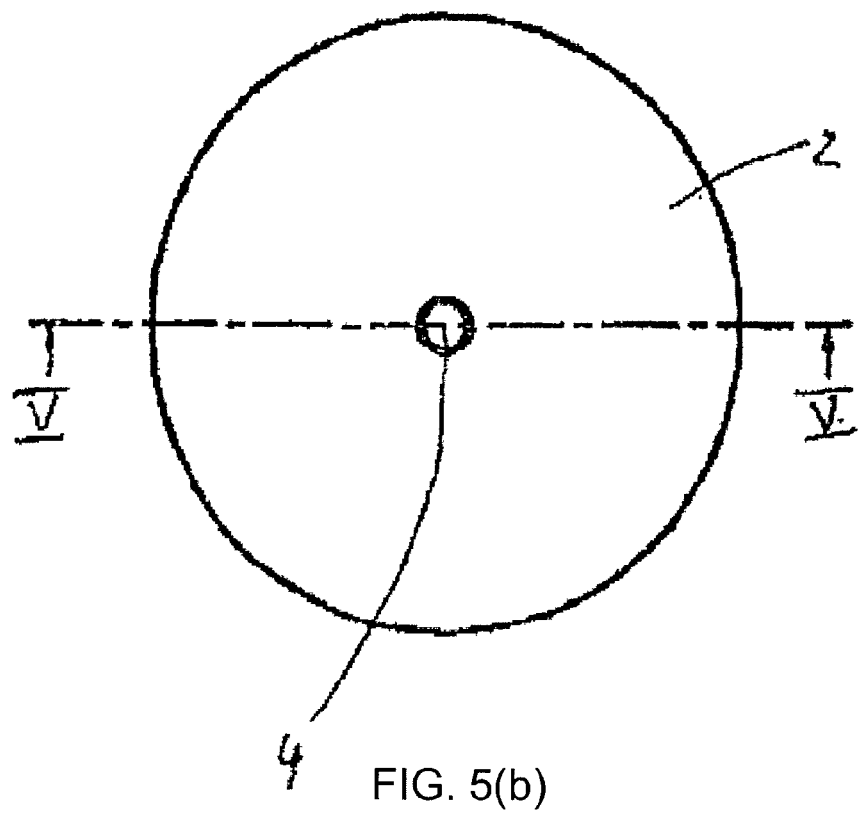

A schematic plan view of a switching valve according to a further exemplary embodiment of the present invention is shown in FIG. 5(b), whilst a section along the line V-V is illustrated in FIG. 5(a).

The valve plate 2 illustrated in FIGS. 5(a)-(b) is situated in its closed position. The valve plate 2 consists of an individual disk, which for example can be produced from a steel, another metal or from a plastic. The valve plate 2 deflects downwardly in the center under the natural weight of the valve plate 2 and the guide 4 so that the valve plate face 6 is bent upwardly in the contact region 10. In the pass-through position, the valve plate face 6 hangs downwardly, in particular in the contact region 10, as is indicated schematically in FIG. 5 by the dashed line.

Due to the deformation of the valve plate 2 under the closing force acting thereon, an angle α is produced between the valve plate face 6 in the contact region 10 and the contact region 10 of the valve plate face 6 in the pass-through position. The difference of the exemplary embodiment shown in FIGS. 5(a)-(b) compared to that shown in FIGS. 1(a)-(b) lies in the fact that an additional sealing element 32 is arranged on the upper end of the valve seat 8, is deformed under the pressure acting thereon of the valve plate 2 and thus seals the valve.

In particularly cost-effective exemplary embodiments of the invention, the individual disks 22, 24, 26 are cut from a thin sheet metal having a high level of surface quality and are screwed together concentrically via a thread on the guide 4. A switching valve of this type can therefore be produced in a very simple and cost-effective manner.

Switching valves of this type can be used both as pressure relief valves and as suction relief valves. Typical response pressures lie for example in the range of 1.5 mbar to 15 mbar. Greater response pressures are also possible however. If the response pressure exceeds mbar for example, this response pressure is generally no longer achieved merely by an increase in the natural weight of the valve plate, but by forces additionally acting on the valve plate 2, for example by means of a spring or a lever. In particular, the exemplary embodiments illustrated in FIGS. 1(a)-(b) to 3(a)-(b), which are provided without a resilient plastic element, are suitable for a very wide temperature range. If the individual components of the valve plate 2 and the valve seat 8 are fabricated from a high-grade steel for example, temperatures of up to 400° C. are possible without difficulty.

LIST OF REFERENCE SIGNS

L longitudinal axis
α angle
2 valve plate
4 guide
6 valve plate face
8 valve seat
10 contact region
12 nut
22 disk
24 disk
26 disk
28 disk
30 resilient element
32 sealing element

The invention claimed is:

1. A relief valve comprising:
a valve seat defining a fluid passage with a longitudinal axis (L);
a valve plate with a valve plate face, which is configured to be brought into a pass-through position at a response pressure within said passage, in which the relief valve is open, and the valve plate is configured to be brought into a closed position, in which the relief valve is closed and the valve plate bears against the valve seat in a singular continuous annular contact region by means of the valve plate face; and
a guide configured to guide the valve plate along the longitudinal axis (L) between the closed position and the pass-through position;

wherein the valve plate has a modulus of elasticity of at least 1000 N/mm², wherein the valve plate deforms in the closed position as a result of a closing force acting thereon, in such a way that the valve plate face in the closed position forms an angle α, which is different from 0°, between the valve plate face in the closed position and the valve plate face in the pass-through position, wherein the valve plate is moveable along the longitudinal axis (L) to bring the valve plate from the closed position into the pass-through position and vice versa, wherein the valve plate and the guide move together along the longitudinal axis (L) to bring the valve plate from the closed position into the pass-through position at the response pressure, and wherein the valve plate and the valve seat make contact only in the singular continuous annular contact region when in the closed position, wherein a thickness of the valve plate increases toward its center, and wherein the valve plate comprises a plurality of disks arranged concentrically with one another, of which the diameter increases toward the valve seat.

2. The relief valve as claimed in claim 1, wherein the angle α is between 0.05° and 10°.

3. The relief valve as claimed in claim 1, wherein, as a result of the closing force, the valve plate deforms in a central region in the closed position by up to 2% of a diameter of the valve seat in the axial direction with respect to the longitudinal axis (L).

4. The relief valve as claimed in claim 1, wherein the valve plate comprises at least one disk having a thickness of 0.5 mm.

5. The relief valve as claimed in claim 1, wherein the valve seat comprises a sealing element against which the valve plate bears via the valve plate face.

6. The relief valve as claimed in claim 1, wherein the valve plate consists of a steel.

7. The relief valve as claimed in claim 1, wherein the valve plate consists of a plastic.

8. The relief valve as claimed in claim 1, wherein the response pressure at which the valve plate is brought from the closed position into the pass-through position is at least 1.5 mbar.

9. The relief valve as claimed in claim 1, wherein the angle α is between 0.1° and 5°.

10. The relief valve as claimed in claim 1, wherein the response pressure at which the valve plate is brought from the closed position into the pass-through position is at least 2.5 mbar.

11. The relief valve as claimed in claim 1, wherein the response pressure at which the valve plate is brought from the closed position into the pass-through position is at least 5 mbar and at most 1000 mbar.

12. The relief valve as claimed in claim 1, wherein the response pressure at which the valve plate is brought from the closed position into the pass-through position is at most 500 mbar.

13. The relief valve as claimed in claim 1, wherein the response pressure at which the valve plate is brought from the closed position into the pass-through position is at most 15 mbar.

14. The relief valve as claimed in claim 1, wherein the valve plate is arranged above the valve seat, and wherein, below the response pressure, weight of the valve plate and the guide resulting from gravitational force is sufficient to provide the closing force under which the valve plate deforms in the closed position.

15. The relief valve as claimed in claim 1, wherein the guide is the centermost element of the relief valve.

* * * * *